United States Patent
Shin et al.

(10) Patent No.: US 12,486,361 B2
(45) Date of Patent: Dec. 2, 2025

(54) METHOD FOR PREPARING POLYHYDROXYURETHANE, POLYHYDROXYURETHANE PREPARED USING THE METHOD AND PRESSURE-SENSITIVE ADHESIVE COMPRISING THE POLYHYDROXYURETHANE

(71) Applicant: KOREA RESEARCH INSTITUTE OF CHEMICAL TECHNOLOGY, Daejeon (KR)

(72) Inventors: Ji Hoon Shin, Daejeon (KR); Jeong Suk Yuk, Daejeon (KR); Sae Hume Park, Daejeon (KR); Nam Kyun Kim, Daejeon (KR)

(73) Assignee: Korea Research Institute Of Chemical Technology, Daejeon (KR)

( * ) Notice: Subject to any disclaimer, the term of this patent is extended or adjusted under 35 U.S.C. 154(b) by 434 days.

(21) Appl. No.: 17/897,692

(22) Filed: Aug. 29, 2022

(65) Prior Publication Data

US 2023/0212355 A1 Jul. 6, 2023

(30) Foreign Application Priority Data

Dec. 30, 2021 (KR) .................. 10-2021-0192174

(51) Int. Cl.
$C08G\ 71/04$ (2006.01)

(52) U.S. Cl.
CPC .......... $C08G\ 71/04$ (2013.01); $C08G\ 2170/40$ (2013.01)

(58) Field of Classification Search
CPC .... C08G 71/04; C08G 2170/40; C08G 64/32; C09J 175/04; C09J 7/38
See application file for complete search history.

(56) References Cited

U.S. PATENT DOCUMENTS

| | | |
|---|---|---|
| 9,416,227 B2 | 8/2016 | Uruno et al. |
| 9,957,356 B2 | 5/2018 | Zhang et al. |
| 10,344,127 B2 | 7/2019 | Zhang et al. |
| 10,513,484 B2 | 12/2019 | Zhang et al. |

(Continued)

FOREIGN PATENT DOCUMENTS

| | | |
|---|---|---|
| JP | 6367769 B2 | 8/2018 |
| KR | 101556837 B1 | 10/2015 |

(Continued)

OTHER PUBLICATIONS

Varanese, "The Fundamentals of Selecting Pressure-Sensitive Adhesives", Medical Plastics and Biomaterials Magazine, Jan. 1998. (Year: 1998).*

(Continued)

*Primary Examiner* — Christopher W Raimund
(74) *Attorney, Agent, or Firm* — HARNESS, DICKEY & PIERCE, P.L.C.

(57) ABSTRACT

Provided are a method for preparing polyhydroxyurethane, polyhydroxyurethane prepared using the method and a pressure-sensitive adhesive comprising the polyhydroxyurethane. According to the present disclosure, it is possible to prepare polyhydroxyurethane in an eco-friendly manner using vegetable oil-derived dimer acid and carbon dioxide and to provide a pressure-sensitive adhesive including the polyhydroxyurethane.

14 Claims, 10 Drawing Sheets

(56) References Cited

U.S. PATENT DOCUMENTS

| | | |
|---|---|---|
| 10,815,186 B2 | 10/2020 | Zhang et al. |
| 10,815,187 B2 | 10/2020 | Zhang et al. |
| 10,815,188 B2 | 10/2020 | Zhang et al. |
| 2014/0030526 A1 | 1/2014 | Uruno et al. |
| 2017/0066880 A1 | 3/2017 | Zhang et al. |
| 2018/0065915 A1 | 3/2018 | Zhang et al. |
| 2019/0002640 A1 | 1/2019 | Zhang et al. |
| 2020/0062688 A1 | 2/2020 | Zhang et al. |
| 2020/0062689 A1 | 2/2020 | Zhang et al. |
| 2020/0062690 A1 | 2/2020 | Zhang et al. |
| 2021/0024698 A1 | 1/2021 | Jana et al. |
| 2021/0053953 A1 | 2/2021 | Seayad et al. |

FOREIGN PATENT DOCUMENTS

| | | |
|---|---|---|
| KR | 10-2018-0031805 A | 3/2018 |
| WO | WO-2019/190409 A1 | 10/2019 |

OTHER PUBLICATIONS

Aouf et al., "Study of the O-glycidylation of natural phenolic compounds—The relationship between the phenolic structure and the reaction mechanism", Tetrahedron, vol. 69, Issue 4, pp. 1345-1353, Nov. 30, 2012. (Year: 2012).*

Office Action for Korean Application No. 10-2021-0192174 dated Dec. 26, 2023 (with English translation).

Bobbink et al., "En route to CO2-containing renewable materials: catalytic synthesis of polycarbonates and non-isocyanate polyhydroxyurethanes derived from cyclic carbonates", Chen. Commun. 2019, 55, 1360-1373.

* cited by examiner

[FIG. 1]
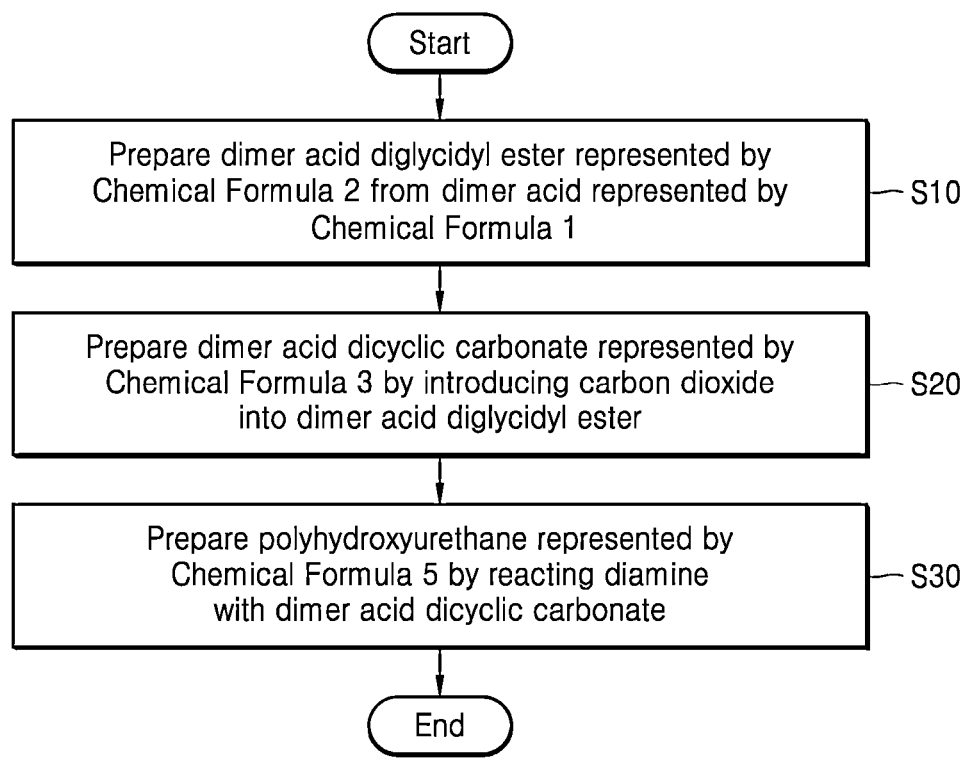

[FIG. 2]
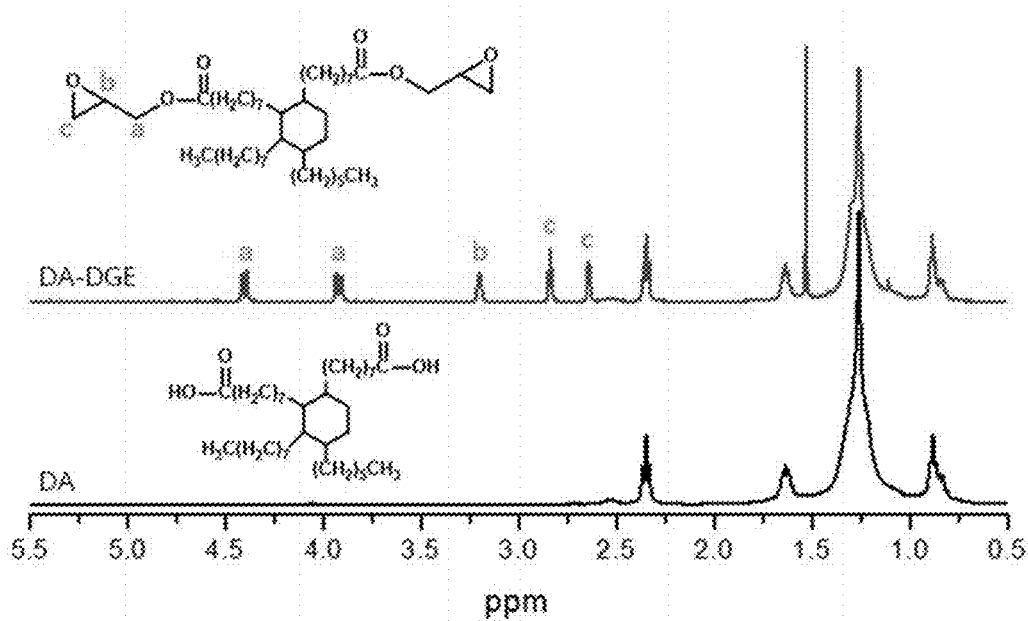
[FIG. 3]
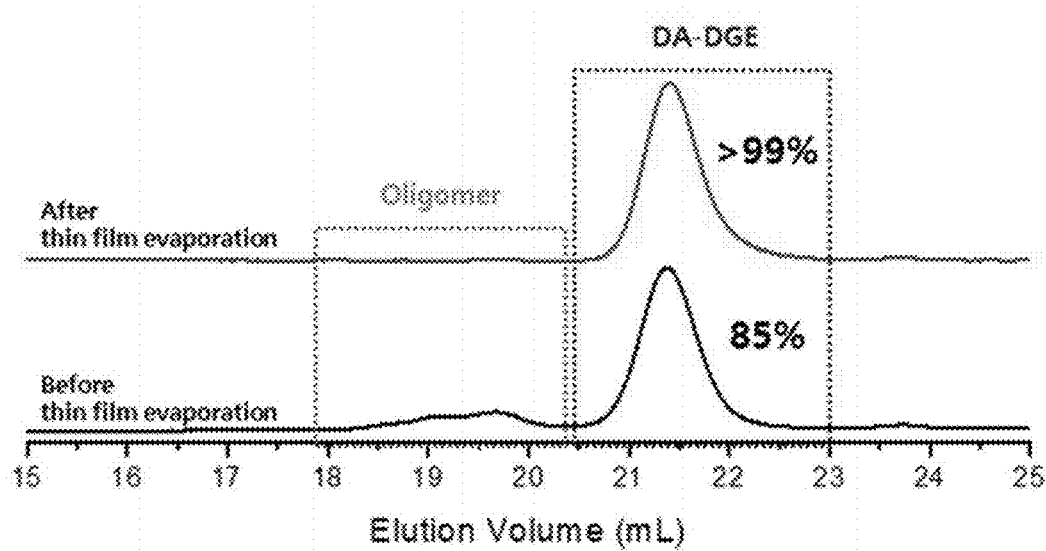

[FIG. 4]
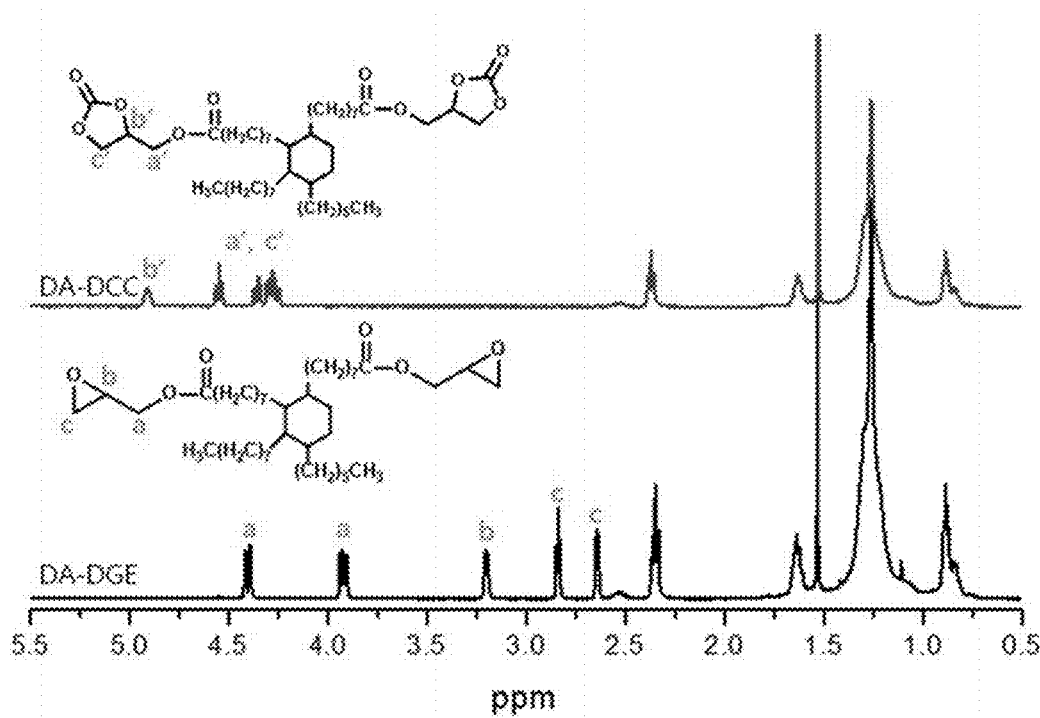
[FIG. 5]
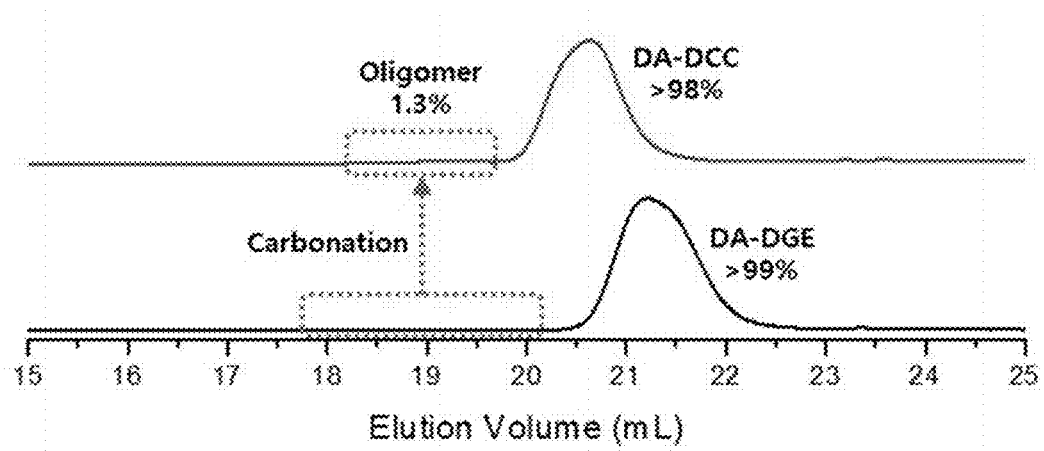

[FIG. 6]
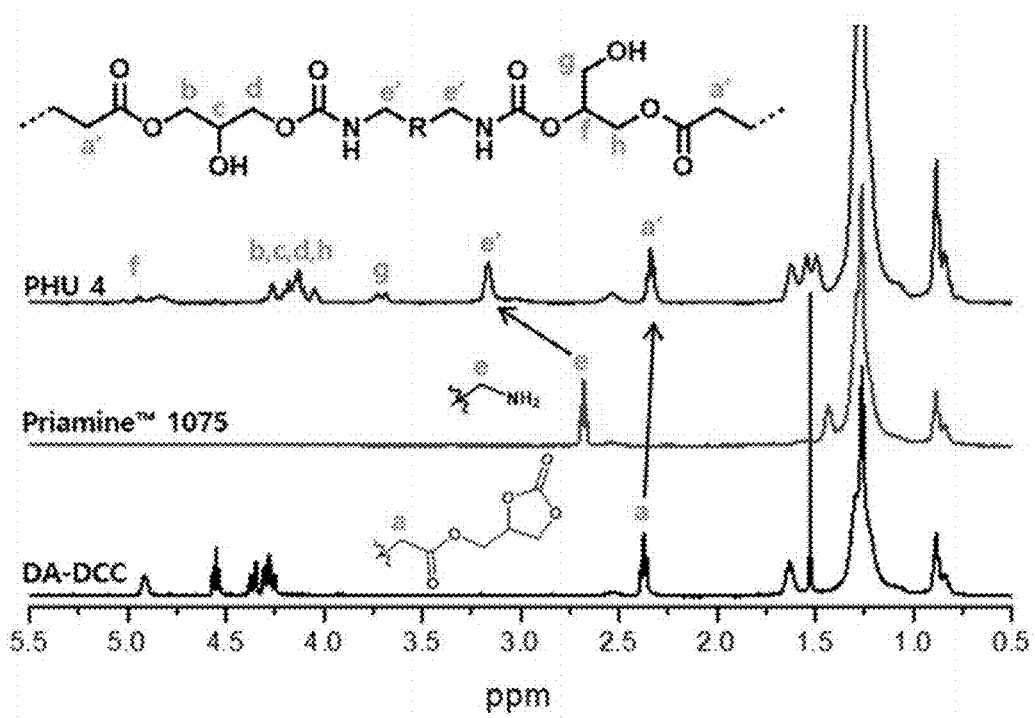
[FIG. 7]
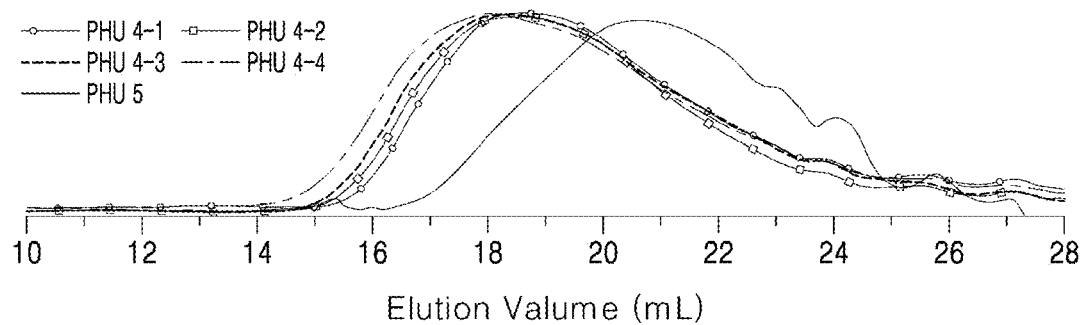

[FIG. 8A]
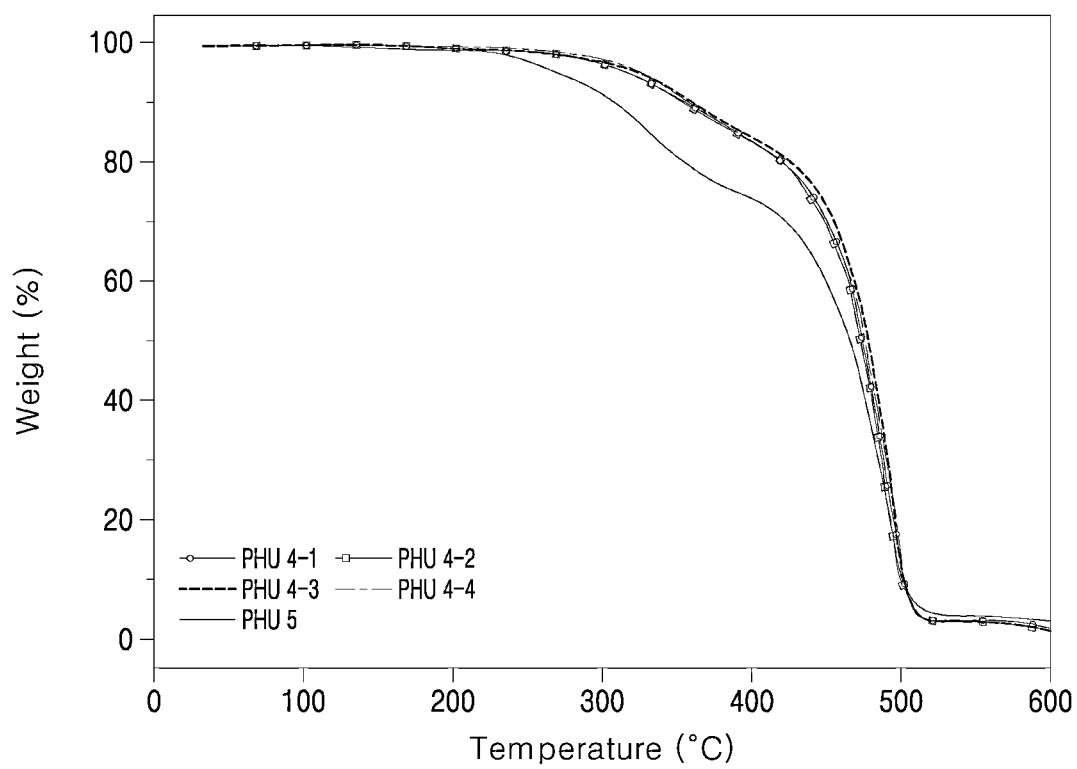

[FIG. 8B]
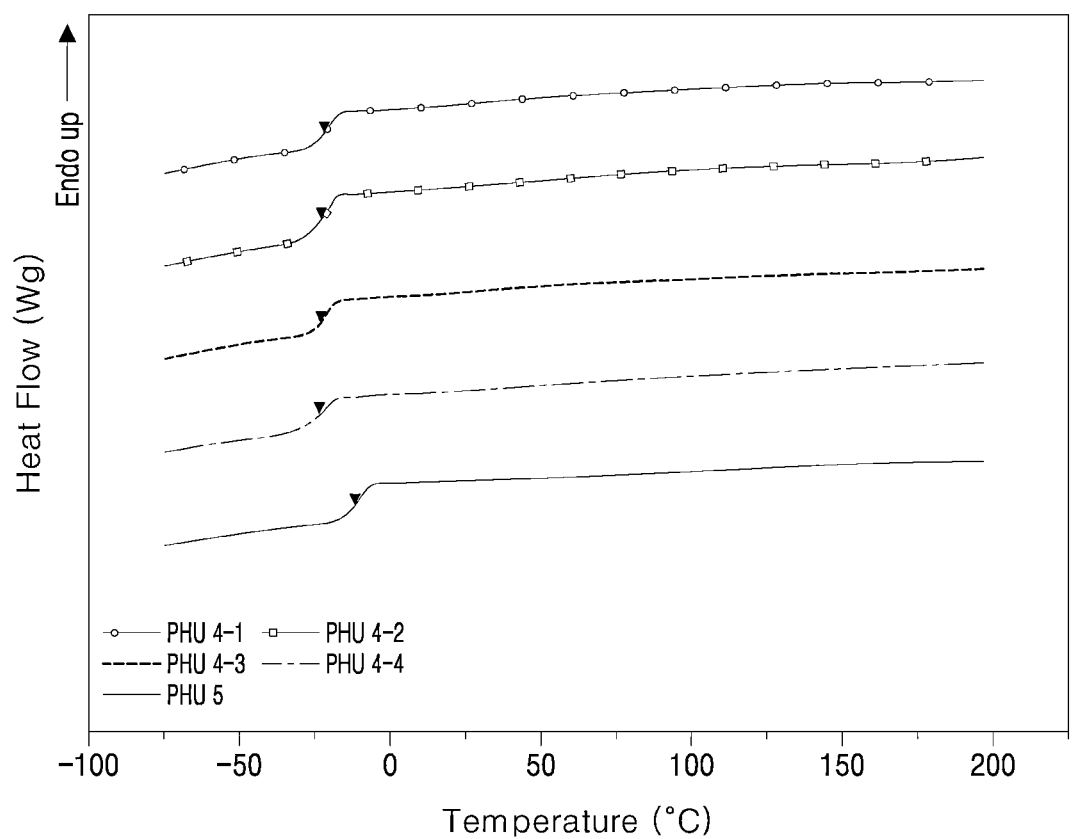

[FIG. 9A]
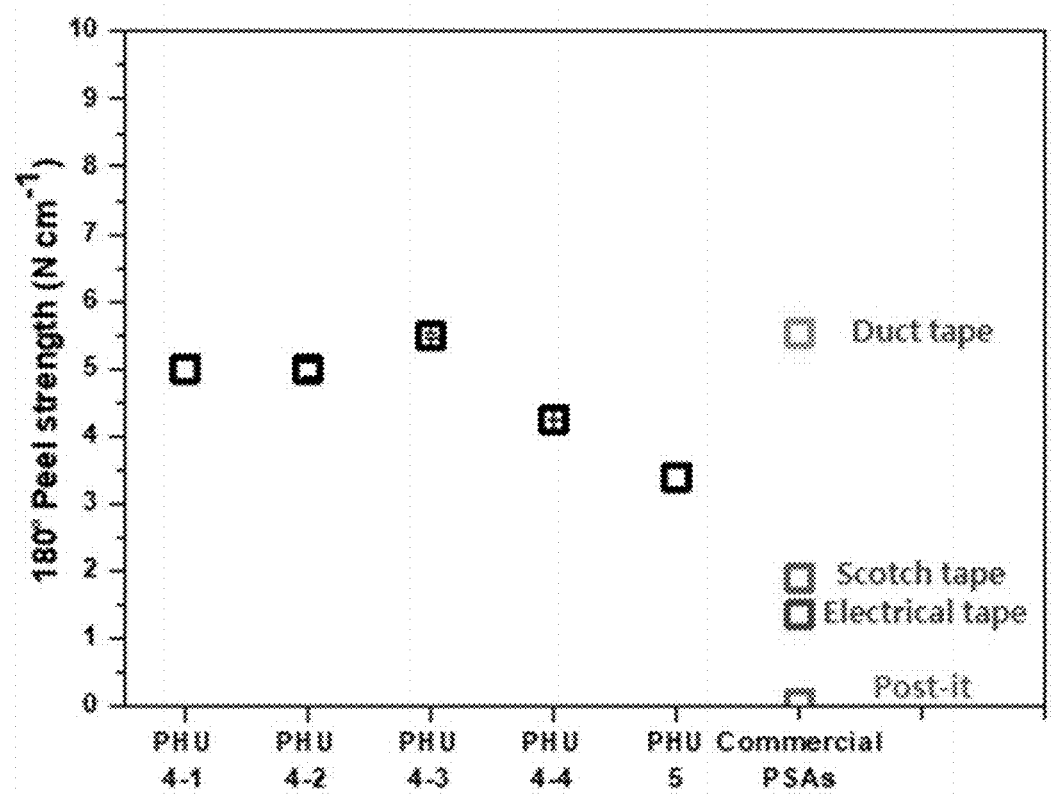

[FIG. 9B]
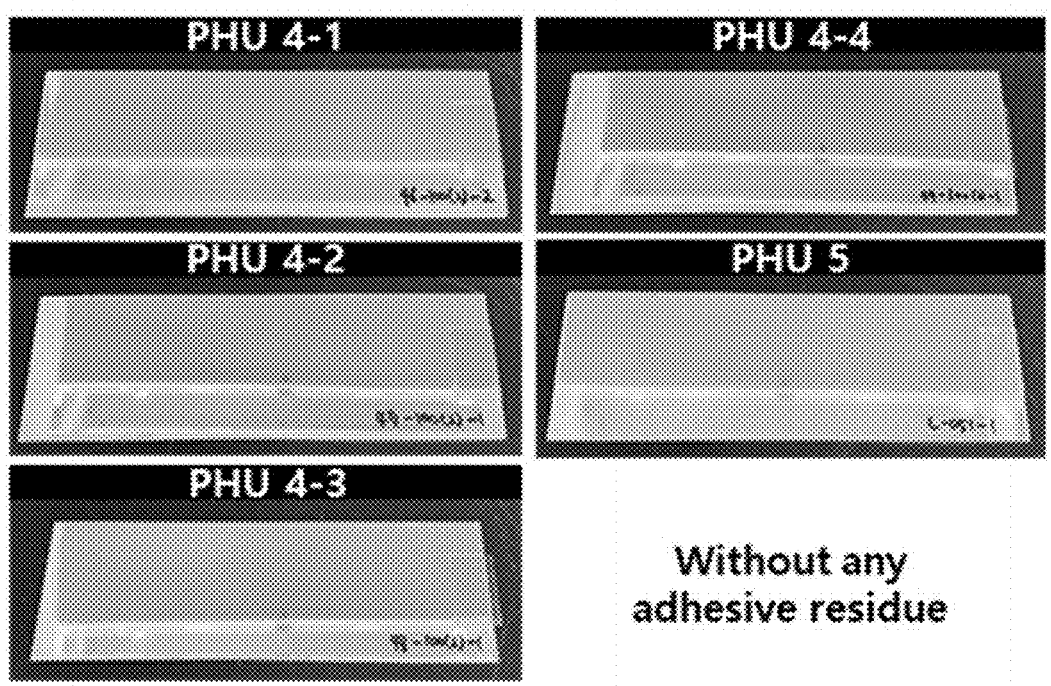

[FIG. 10]
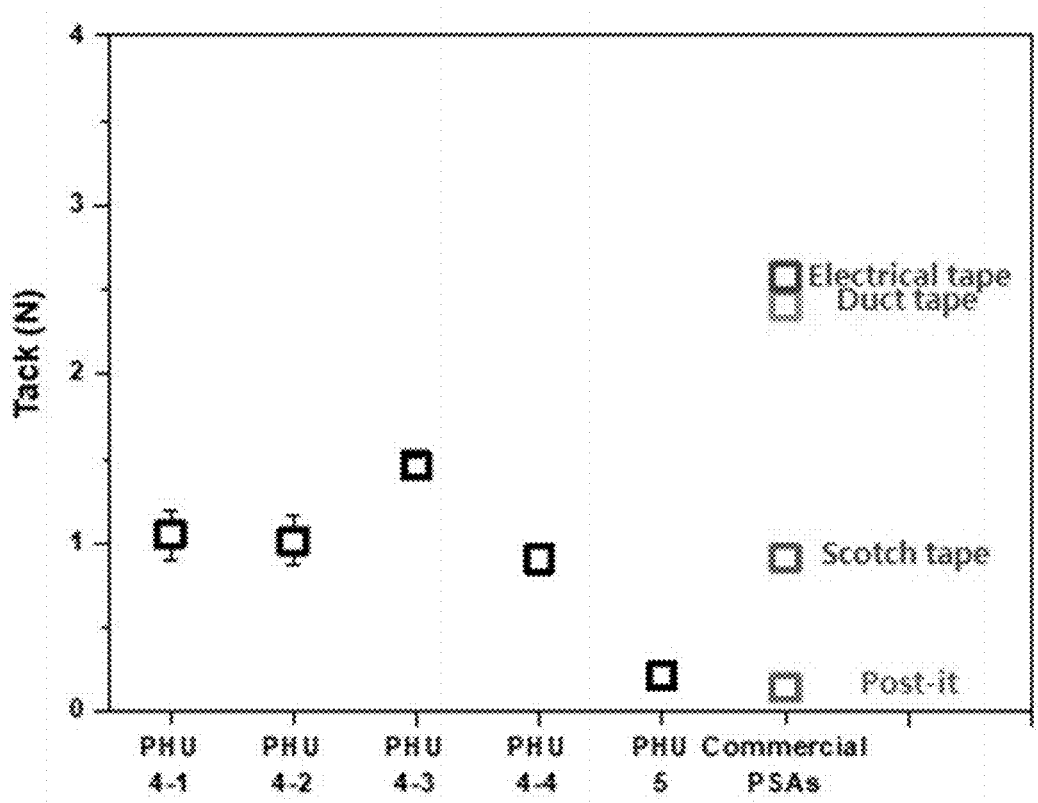

[FIG. 11]
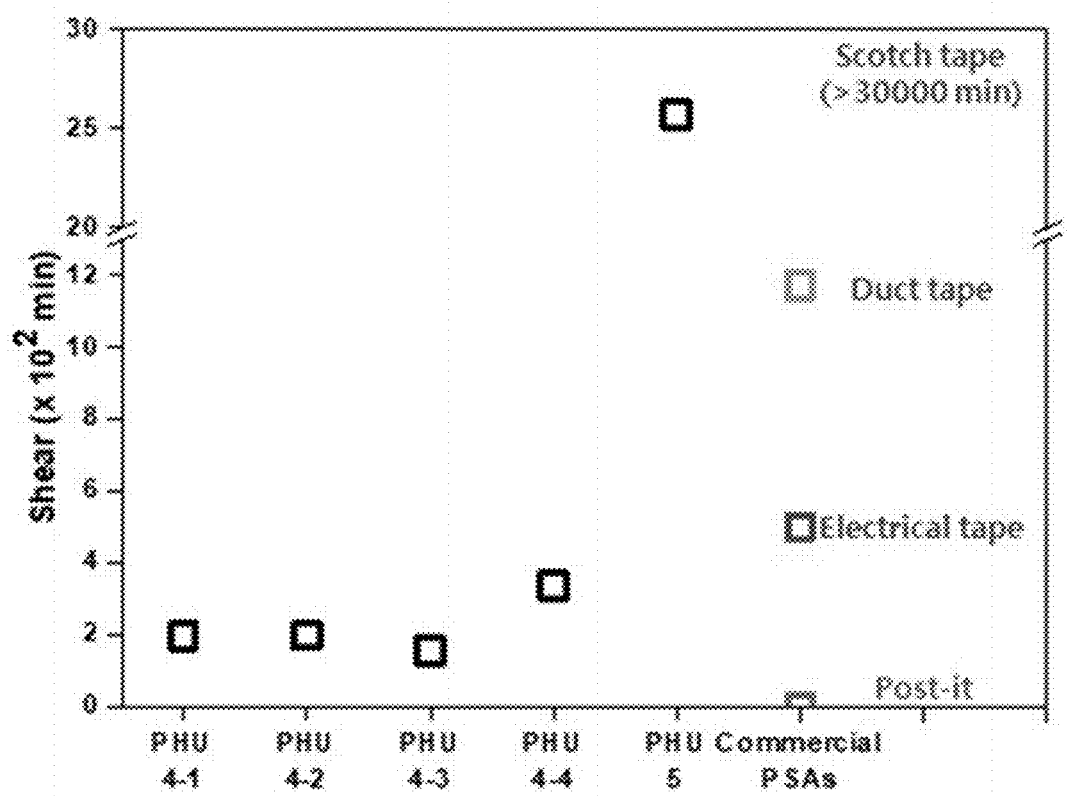

METHOD FOR PREPARING POLYHYDROXYURETHANE, POLYHYDROXYURETHANE PREPARED USING THE METHOD AND PRESSURE-SENSITIVE ADHESIVE COMPRISING THE POLYHYDROXYURETHANE

CROSS-REFERENCE TO RELATED APPLICATIONS

This application claims the priority of Korean Patent Application No. 10-2021-0192174 filed on Dec. 30, 2021, in the Korean Intellectual Property Office, the disclosure of which is incorporated herein by reference.

BACKGROUND OF THE INVENTION

Field of the Invention

The present disclosure relates to a method for preparing polyhydroxyurethane, polyhydroxyurethane prepared using the method and a pressure-sensitive adhesive comprising the polyhydroxyurethane.

Description of the Related Art

Polyurethane (PU) accounts for about 7 wt % of the global plastic product market and is a polymer produced over 20 kton per year, and has been widely used in foams, coatings, elastomers, etc. due to its excellent properties.

Conventional polyurethanes are produced through step-growth polymerization of polyisocyanate and polyol, but due to the harmfulness of isocyanate, a synthetic raw material, and the disadvantage of using phosgene, a toxic gas, for production of isocyanate, development of a safe and eco-friendly polyurethane production process is required.

Various studies on Non-isocyanate PU (NIPU) have been actively researched as an alternative for producing polyurethane from a safe process and a sustainable raw material. Polyhydroxyurethane [poly (hydroxy urethane), PHU], a type of non-isocyanate polyurethane (NIPU), may be synthesized through a polyaddition reaction of cyclic carbonates and amines. The cyclic carbonates may be synthesized by inserting carbon dioxide ($CO_2$) into epoxy resin. There is an advantage of enabling the production of polyurethane based on various sustainable raw materials.

As a unique characteristic of polyhydroxyurethane, unlike conventional polyurethanes, the polyhydroxyurethane has a hydroxyl group, which induces additional hydrogen bonding in addition to hydrogen bonding between urethane groups, thereby enhancing chemical resistance and physical properties.

In consideration of these aspects, the present inventors prepared polyhydroxyurethane by preparing a dicyclic carbonate based on dimer acid (DA) derived from vegetable oils and then reacted with various diamines, confirmed its adhesive properties, and developed an pressure-sensitive adhesive including the polyhydroxyurethane.

SUMMARY OF THE INVENTION

An object of the present disclosure is to provide a method for preparing polyhydroxyurethane, polyhydroxyurethane prepared using the method and a pressure-sensitive adhesive comprising the polyhydroxyurethane.

Another object of the present disclosure is to provide a pressure-sensitive adhesive including polyhydroxyurethane by preparing eco-friendly polyhydroxyurethane using vegetable oils and carbon dioxide.

The objects to be solved by the present disclosure are not limited to the aforementioned object(s), and other object(s), which are not mentioned above, will be apparent to those skilled in the art from the following description.

According to an aspect of the present disclosure, there is provided a method for preparing polyhydroxyurethane including: (a) preparing dimer acid diglycidyl ester represented by Chemical Formula 2 below from dimer acid represented by Chemical Formula 1 below; (b) preparing dimer acid dicyclic carbonate represented by Chemical Formula 3 below by introducing carbon dioxide ($CO_2$) into the dimer acid diglycidyl ester prepared in step (a); and (c) preparing polyhydroxyurethane represented by Chemical Formula 5 below by reacting diamine with the dimer acid dicyclic carbonate prepared in step (b):

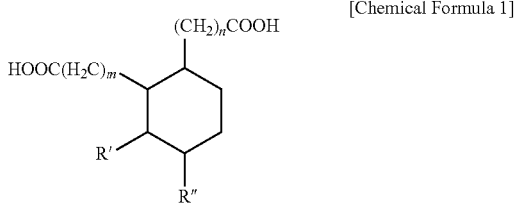

[Chemical Formula 1]

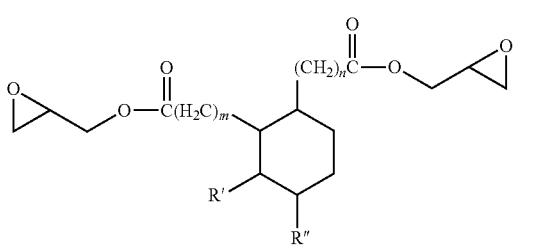

[Chemical Formula 2]

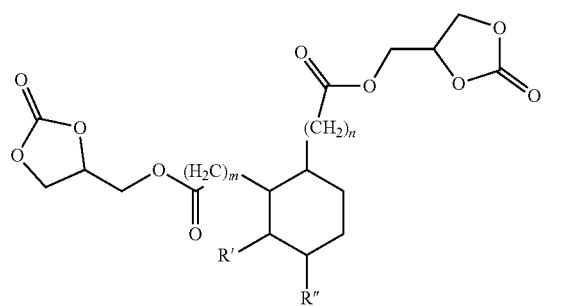

[Chemical Formula 3]

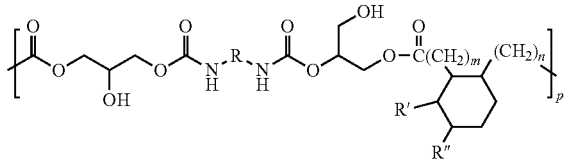

[Chemical Formula 5]

Wherein, R, R' and R" may be the same or different and substitutable hydrocarbon groups, and represent an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n, m and p may be the same or different, and may be integers of 1 to 10.

The dimer acid represented by Chemical Formula 1 may be derived from vegetable oils.

Step (a) may be performed by a first reaction by adding epichlorohydrin and benzyltriethylammonium chloride to the dimer acid represented by Chemical Formula 1 and then a second reaction by adding calcium oxide (CaO) and sodium hydroxide (NaOH).

The first reaction may be performed at 100 to 130° C. for 20 to 40 minutes.

The second reaction may be performed at 60 to 80° C. for 70 to 110 minutes.

Step (b) may be performed at 70 to 100° C. for 15 to 25 hours.

The diamine of step (c) may be represented by Chemical Formula 4:

[Chemical Formula 4]

Wherein, R may be a substitutable hydrocarbon group, and represent an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group.

The diamine in step (c) may be selected from the group consisting of C1-C12 alkylenediamine, benzenediamine, phenyldiamine, cyclohexanediamine and dimerdiamine.

Step (c) may be performed at 60 to 100° C. for 2 to 24 hours.

According to another aspect of the present disclosure, there is provided polyhydroxyurethane prepared by the aforementioned method and represented by Chemical Formula 5 below:

[Chemical Formula 5]

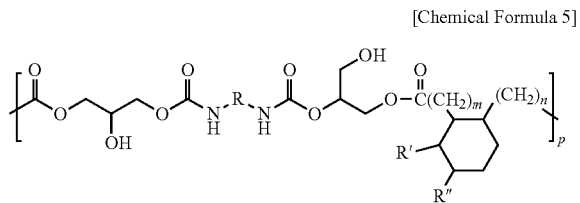

Wherein, R, R' and R" may be the same or different and substitutable hydrocarbon groups, and represent an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n, m and p may be the same or different, and may be integers of 1 to 10.

The polyhydroxyurethane may comprise carbon dioxide of 1 to 20 wt % based on the total weight.

According to yet another aspect of the present disclosure, there is provided a pressure-sensitive adhesive including the polyhydroxyurethane described above.

The 180° peel adhesion (ASTM D3330) of the pressure-sensitive adhesive may be 3 to 6 N cm$^{-1}$.

The initial tack force (ASTM D2979) of the pressure-sensitive adhesive may be 0.1 to 2 N.

The shear strength (ASTM D3654) of the pressure-sensitive adhesive may be $1\times10^2$ to $30\times10^2$ min.

According to the present disclosure, since vegetable oil-derived dimer acid and carbon dioxide are used and no solvent is used, it is possible to prepare polyhydroxyurethane in an eco-friendly manner.

Further, it is possible to provide a pressure-sensitive adhesive including polyhydroxyurethane prepared using vegetable oil-derived dimer acid and carbon dioxide.

It should be understood that the effects of the present disclosure are not limited to the effects, but include all effects that can be deduced from the detailed description of the present disclosure or configurations of the present disclosure described in appended claims.

BRIEF DESCRIPTION OF THE DRAWINGS

FIG. 1 illustrates a process flowchart of a method for preparing polyhydroxyurethane according to an embodiment of the present disclosure.

FIG. 2 is a graph showing a result of $^1$H-NMR analysis of dimer acid diglycidyl ester according to an embodiment of the present disclosure.

FIG. 3 is a graph showing a result of size exclusion chromatography (SEC) analysis of dimer acid diglycidyl ester according to an embodiment of the present disclosure.

FIG. 4 is a graph showing a result of 1H-NMR analysis of dimer acid diglycidyl ester and dimer acid dicyclic carbonate according to an embodiment of the present disclosure.

FIG. 5 is a graph showing a result of size exclusion chromatography (SEC) analysis of dimer acid diglycidyl ester and dimer acid dicyclic carbonate according to an embodiment of the present disclosure.

FIG. 6 is a graph showing a result of $^1$H-NMR analysis of dimer acid dicyclic carbonate, Priamine™ 1075 and PHU according to an embodiment of the present disclosure.

FIG. 7 is a graph showing a result of size exclusion chromatography (SEC) analysis of PHU 4-1, PHU 4-2, PHU 4-3, PHU 4-4, and PHU 5 according to an embodiment of the present disclosure.

FIG. 8A shows a thermogravimetric analysis (TGA) graph of PHU 4-1, PHU 4-2, PHU 4-3, PHU 4-4, and PHU 5 according to an embodiment of the present disclosure, and FIG. 8B shows a differential scanning calorimetry (DSC) graph of PHU 4-1, PHU 4-2, PHU 4-3, PHU 4-4, and PHU 5 according to an embodiment of the present disclosure.

FIG. 9A is a graph showing peel strength of a polyhydroxyurethane (PHU)-based pressure-sensitive adhesive (PSA) according to an embodiment of the present disclosure and a commercial pressure-sensitive adhesive tape. FIG. 9B is a photograph showing no adhesive residue remaining when the polyhydroxyurethane (PHU)-based pressure-sensitive adhesive (PSA) according to an embodiment of the present disclosure are separated from a stainless steel plate.

FIG. 10 is a graph showing initial tack forces of the polyhydroxyurethane (PHU)-based pressure-sensitive adhesive (PSA) according to an embodiment of the present disclosure and the commercial pressure-sensitive adhesive tape.

FIG. 11 is a graph showing shear strengths of the polyhydroxyurethane (PHU)-based pressure-sensitive adhesive (PSA) according to an embodiment of the present disclosure and the commercial pressure-sensitive adhesive tape.

DETAILED DESCRIPTION OF THE PREFERRED EMBODIMENT

Before describing the present disclosure in detail, terms or words used in this specification should not be construed as unconditionally limited to a conventional or dictionary meaning, and the inventors of the present disclosure can appropriately define and use the concept of various terms in order to describe their invention in the best method. Furthermore, it should be understood that these terms or words should be interpreted as meanings and concepts consistent with the technical idea of the present disclosure.

That is, the terms used in the present disclosure are only used to describe a preferred embodiment of the present disclosure, and are not intended to specifically limit the contents of the present disclosure, and it should be noted that these terms are terms defined in consideration with various possibilities of the present disclosure.

In addition, in this specification, it should be understood that the singular expression may include a plural expression unless clearly indicated in another meaning in the context, and even if similarly expressed in the plural, the singular expression may include the meaning of the singular number.

Throughout the present disclosure, when a component is described as "including" the other component, the component does not exclude any other component, but may further include any other component unless otherwise indicated in contrary.

Further, hereinafter, in the following description of the present disclosure, a detailed description of a configuration determined to unnecessarily obscure the subject matter of the present disclosure, for example, known technologies including the related arts may be omitted.

Hereinafter, the present disclosure will be described in more detail.

Method for Preparing Polyhydroxyurethane

FIG. 1 is a process flowchart of a method for preparing polyhydroxyurethane of the present disclosure. Referring to FIG. 1, the method for preparing polyhydroxyurethane of the present disclosure includes preparing dimer acid diglycidyl ester represented by Chemical Formula 2 from dimer acid represented by Chemical Formula 1 (S10); preparing dimer acid dicyclic carbonate represented by Chemical Formula 3 by introducing carbon dioxide ($CO_2$) into the dimer acid diglycidyl ester (S20); and preparing polyhydroxyurethane represented by Chemical Formula 5 by reacting diamine with the dimer acid dicyclic carbonate (S30).

Hereinafter, the method will be described in detail for each step.

(a) The dimer acid diglycidyl ester represented by Chemical Formula 2 is prepared from the dimer acid represented by Chemical Formula 1 (S10).

[Chemical Formula 1]

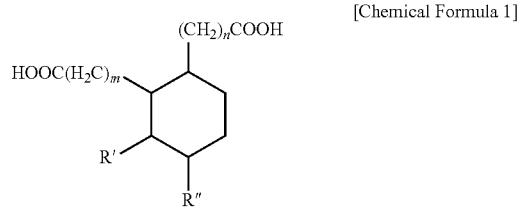

[Chemical Formula 2]

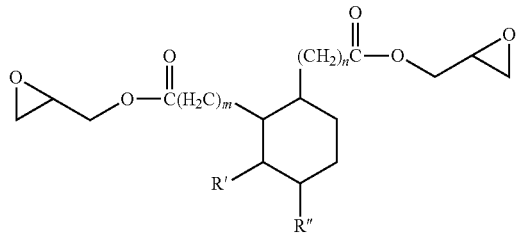

Wherein, R' and R" are the same or different and substitutable hydrocarbon groups, and represent an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl groups, and n and m are the same or different, and are integers of 1 to 10.

The reaction in step S10 may be represented by Reaction Formula 1 below.

[Reaction Formula 1]

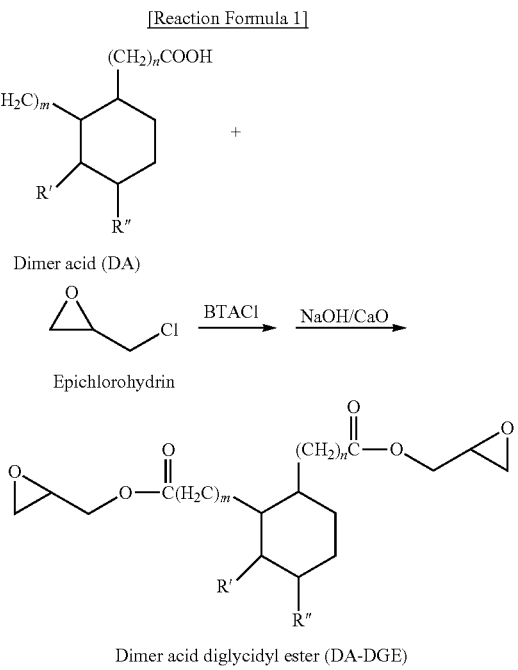

Dimer acid diglycidyl ester (DA-DGE)

Dimer acid (DA) represented by Chemical Formula 1 may be prepared from vegetable oil-derived fatty acids.

The reaction of Reaction Formula 1 may be performed in two steps, which may be a first reaction by adding epichlorohydrin and benzyltriethylammonium chloride to dimer acid and a second reaction by adding calcium oxide (CaO) and sodium hydroxide (NaOH).

Specifically, the first reaction may be performed at 100 to 130° C. for 20 to 40 minutes, and the second reaction may be performed at 60 to 80° C. for 70 to 110 minutes.

When the first reaction conditions (temperature, reaction time) are less than the above range, a reaction between a carboxylic acid group of dimer acid and an epoxy group of epichlorohydrin may not occur sufficiently, and when the conditions exceed the above range, dimer acid oligomers of a molecular weight of 1000 to 3000 g/mol may be produced in excess.

If the conditions (temperature, reaction time) of the second reaction are out of the above range, a ring-closing reaction may not occur sufficiently, so that the formation of the epoxy group may not be smooth.

The dimer acid diglycidyl ester synthesized through the reaction may be separated and subjected to additional steps in order to obtain high purity. The additional steps may include centrifugation, evaporation, filtration, distillation, and the like.

(b) The dimer acid dicyclic carbonate represented by Chemical Formula 3 below is prepared by introducing carbon dioxide ($CO_2$) into the dimer acid diglycidyl ester prepared in step (a) (S20).

[Chemical Formula 3]

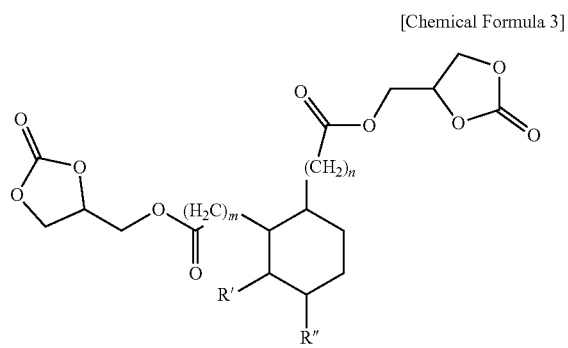

Wherein, R', R", n and m are the same as described above.

The reaction in step S20 may be represented by Reaction Formula 2 below.

[Reaction Formula 2]

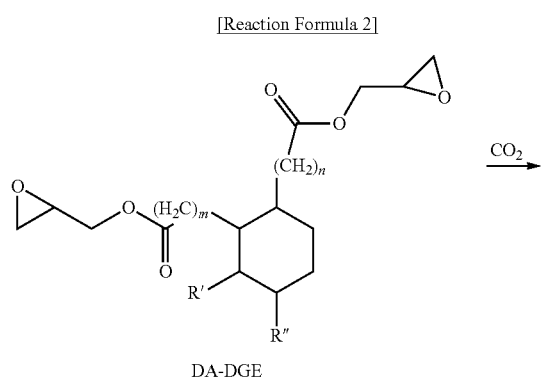

DA-DGE

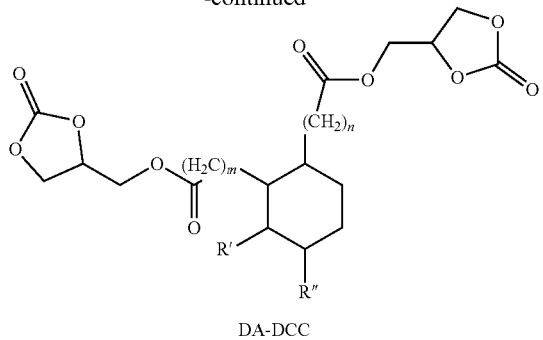

DA-DCC

Step S20 may be a process of preparing dimer acid dicyclic carbonate (DA-DCC) by reacting carbon dioxide with dimer acid diglycidyl ester (DA-DGE) using tetrabutylammonium bromide as a catalyst to insert the carbon dioxide into an epoxy group.

The reaction may be performed at 70 to 100° C. for 15 to 25 hours. In the case of less than the above range, the conversion rate of a carbonation reaction of epoxy may be low, and in the case of more than the above range, the formation of dimer acid oligomers having a molecular weight of 1000 to 3000 g/mol may occur.

(c) The polyhydroxyurethane represented by Chemical Formula 5 below is prepared by reacting diamine with the dimer acid dicyclic carbonate prepared in step S20 (S30).

[Chemical Formula 5]

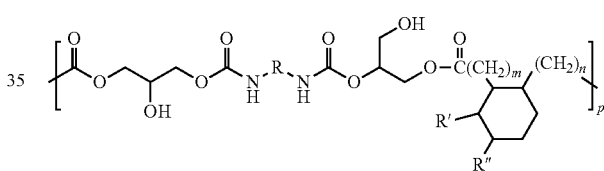

Wherein, R', R", n and m are the same as described above.

R is a substitutable hydrocarbon group, and represents an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and p is an integer of 1 to 10.

The reaction in step S30 may be represented by Reaction Formula 3 below.

[Reaction Formula 3]

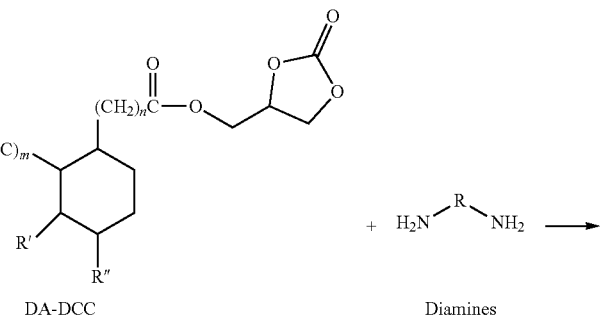

DA-DCC                                    Diamines

-continued

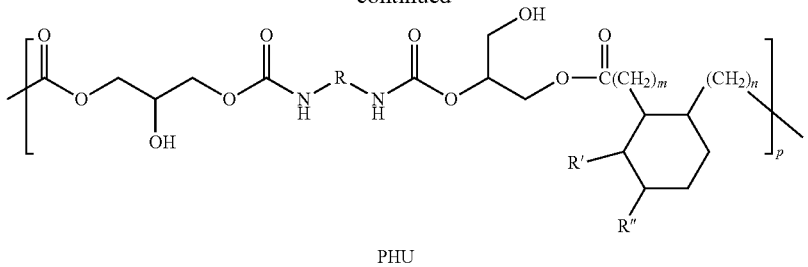

PHU

In step S30, polyhydroxyurethane is prepared by reacting diamine with dimer acid dicyclic carbonate (DA-DCC), and the diamine may be represented by Chemical Formula 4 below.

[Chemical Formula 4]

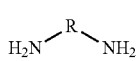

Wherein, R is a substitutable hydrocarbon group, and represents an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group.

The diamine used in step S30 is particularly preferably selected from the group consisting of C1-C12 alkylenediamine, benzenediamine, phenyldiamine, cyclohexanediamine and dimerdiamine.

The reaction may be performed at 60 to 100° C. for 2 to 24 hours. In the case of less than the above range, it may be difficult to expect physical properties as a pressure-sensitive adhesive due to the low molecular weight of PHU, and in the case of more than the above range, side reactions may occur to form by-products or increase a molecular weight distribution.

Polyhydroxyurethane

The present disclosure provides polyhydroxyurethane prepared by the above-described method for preparing polyhydroxyurethane, and represented by Chemical Formula 5 below:

[Chemical Formula 5]

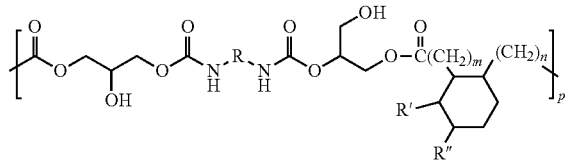

Wherein, R, R' and R" are the same or different and substitutable hydrocarbon groups, and represent an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n, m and p are the same or different, and are integers of 1 to 10.

Unlike conventional polyurethanes, the polyhydroxyurethane has a hydroxyl group, which induces additional hydrogen bonding in addition to hydrogen bonding between urethane groups, thereby enhancing chemical resistance and physical properties.

The polyhydroxyurethane according to the present disclosure may have a carbon dioxide content of 1 to 20 wt % based on the total weight.

In addition, since the polyhydroxyurethane according to the present disclosure is synthesized using vegetable oil-derived dimer acid and carbon dioxide, a neutral carbon content may be 30 to 60 wt %.

Pressure-Sensitive Adhesive Including Polyhydroxyurethane

The present disclosure provides a pressure-sensitive adhesive including the polyhydroxyurethane described above.

The polyhydroxyurethane may be used as a pressure-sensitive adhesive by exhibiting adhesive properties, and the polyhydroxyurethane may be mixed with a solvent and then applied and used to an adhering surface.

The pressure-sensitive adhesive including the polyhydroxyurethane according to the present disclosure exhibits the following adhesive properties.

The 180° peel adhesion (ASTM D3330) of the pressure-sensitive adhesive may be 3 to 6 N $cm^{-1}$.

The initial tack force (ASTM D2979) of the pressure-sensitive adhesive may be 0.1 to 2 N.

The shear strength (ASTM D3654) of the pressure-sensitive adhesive may be $1 \times 10^2$ to $30 \times 10^2$ min.

EXAMPLES

Hereinafter, the present disclosure will be described in detail with reference to Examples for specific description. However, Examples according to the present disclosure may be modified in various forms, and it is not interpreted that the scope of the present disclosure is limited to the following Examples. Examples of the present disclosure will be provided for more completely explaining the present disclosure to those skilled in the art.

Example 1

<Example 1-1> Synthesis of Dimer Acid Diglycidyl Ester (DA-DGE)

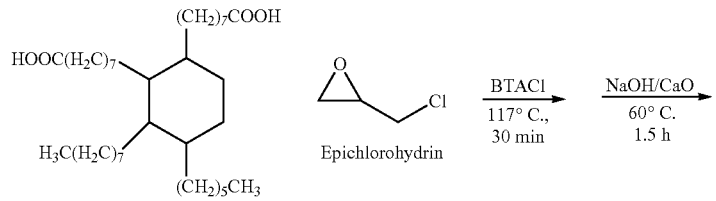

Dimer acid (DA)   Epichlorohydrin

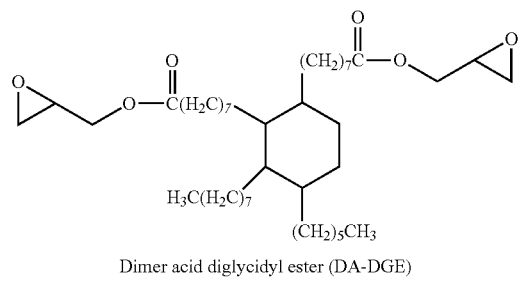

Dimer acid diglycidyl ester (DA-DGE)

Hydrogenated dimer acid (300 g, 531 mmol, SIGMA-ALDRICH), epichlorohydrin (744 g, 7966 mmol, ≥99%, SIGMA-ALDRICH), and benzyltriethylammonium chloride (4.89 g, 21.2 mmol, 99%, SIGMA-ALDRICH) were added in a 2 L 3-neck round bottom flask, stirred for 30 minutes in an oil bath at a temperature of 117° C. using a magnetic stirrer, and then cooled to 70° C. by installing using a reflux condenser and a thermocouple.

Calcium oxide (119 g, 2124 mmol, reagent grade, SIGMA-ALDRICH), and sodium hydroxide (85.0 g, 2124 mmol, >98.0%, SAMCHUN CHEMICALS) were added, stirred at 70° C. for 90 minutes, and then cooled to room temperature to separate a mixture using a centrifuge (4° C., 15 min, 10000 rpm).

After the separated supernatant was recovered, ethyl acetate was added to the remaining solid phase, mixed, and centrifuged, and all liquid materials obtained after repeating the procedure once were evaporated at 30° C. to remove ethyl acetate.

The obtained liquid materials were filtered twice using silica gel, and then subjected to thin film evaporation. The first thin film evaporation was performed at 10) mTorr at room temperature to remove residual epichlorohydrin.

As can be seen from an NMR analysis result of FIG. 2 and a SEC analysis result of FIGS. 3, 85 to 90% of DA-DGE and 10 to 15% of oligomer were confirmed. The oligomer was dimer acid oligomer having a molecular weight of 1000 to 3000 g/mol.

The mixture obtained through the first thin film evaporation was subjected to second thin film evaporation under a condition of 240° C. and 0.5 to 3 mTorr to remove dimer acid oligomers, thereby obtaining 97% or more of DA-DGE (FIG. 3).

<Example 1-2> Synthesis of Dimer Acid Dicyclic Carbonate (DA-DCC)

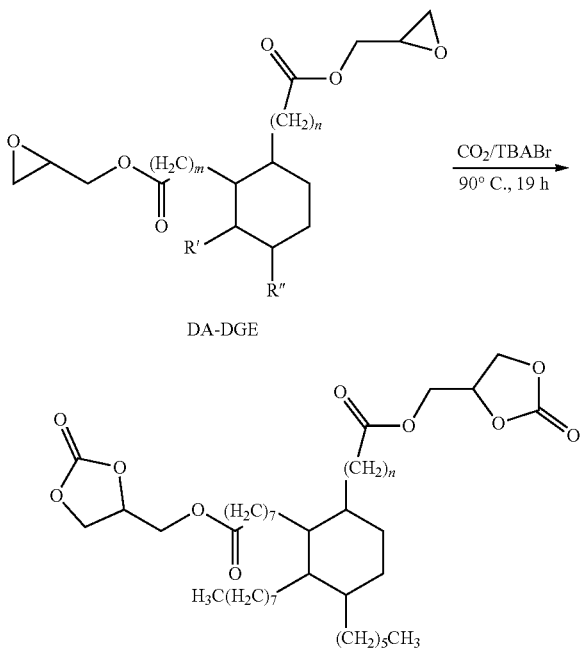

DA-DGE (60.0 g, 88.6 mmol), tetrabutylammonium bromide (0.857 g, 2.66 mmol, SIGMA-ALDRICH), and $CO_2$ gas (bubbling, 100 cc/min) were added in a 500 mL 2-neck round bottom flask and then stirred at 90° C. for 19 hours using a magnetic stirrer.

After completion of the reaction, a conversion rate of 99% or more (FIG. 4) through NMR and a dimer acid oligomer content of about 2% through SEC (FIG. 5) were confirmed.

<Example 1-3> Synthesis of Polyhydroxyurethane (Poly (Hydroxy Urethane), PHU)

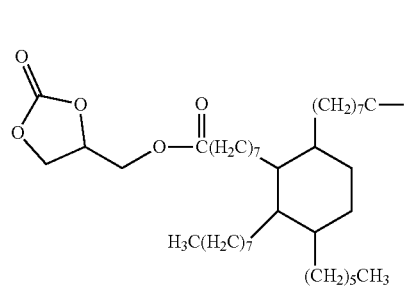
DA-DCC

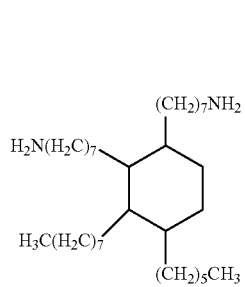
Priamine 1075 (CRODA)

or H₂N–R–NH₂ Diamines

80° C., 24 h

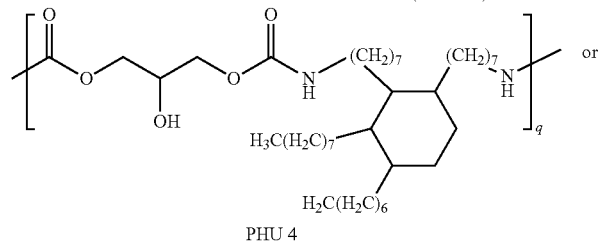
PHU 4

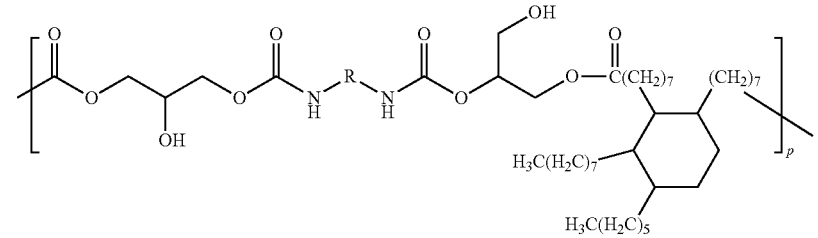
PHU 5

Wherein, p and q may be the same or different, and integers of 1 to 10.

DA-DCC (6.00 g, 7.84 mmol) and Priamine™ 1075 (4.03 g, 7.84 mmol, CRODA), a type of dimeramine, were added into a 250 mL glass reactor, and then the inside of the reactor was purged with $N_2$ gas, and then the mixture was stirred at 80° C. for 2 to 24 hours using a mechanical stirrer to synthesize PHU 4-1, 4-2, 4-3, and 4-4, respectively (Table 1)

In addition, DA-DCC (10.0 g, 13.1 mmol) and cadaverine (1.43 g, 13.1 mmol, 95%, SIGMA-ALDRICH), a type of alkylenediamine, were added to a 250 mL glass reactor, and then reacted for 24 hours in the same manner as described above to synthesize PHU 5 (Table 1).

Referring to the NMR analysis of FIG. 6, the disappearance of a peak appearing from methylene of an amine group and a cyclic carbonate group may be observed, and protons a to h resulting from PHU were confirmed.

Referring to SEC analysis of FIG. 7, in PHU 4 (PHU 4-1 to PHU 4-4), as the reaction time increased, a molecular weight and a polydispersity index (Đ) increased, wherein Mn=16.0 to 18.3 kg mol$^{-1}$, Mw=32.3 to 47.3 kg mol$^{-1}$, and Đ=2.01 to 2.59, and PHU 5 showed a result of Mn=7.70 kg mol$^{-1}$, Mw=14.5 kg mol$^{-1}$, and Đ=1.89 (Table 1, FIG. 7).

As a result of TGA analysis of FIG. 8A, a 5% decomposition temperature (Td 5%) was observed as 320 to 330° C. in the case of PHU 4 (PHU 4-1 to PHU 4-4), and 275° C. in the case of PHU 5. Through DSC analysis of FIG. 8B, it was confirmed that PHU 4 (PHU 4-1 to PHU 4-4) and PHU 5 exhibited glass transition temperatures (Tg) of −20.9 to −21.6° C. and 10.5° C., respectively (Table 1, and FIGS. 8A and 8B).

TABLE 1

| PHUs | Temp. (° C.) | Time (h) | $M_n$ (kg mol$^{-1}$) | $M_w$ (kg mol$^{-1}$) | Đ | $T_{d\,5\%}$ (° C.) | $T_g$ (° C.) |
|---|---|---|---|---|---|---|---|
| PHU 4-1 | 80 | 2 | 16.0 | 32.3 | 2.01 | 320 | −20.9 |
| PHU 4-2 | 80 | 6 | 17.2 | 36.8 | 2.15 | 328 | −21.6 |
| PHU 4-3 | 80 | 12 | 17.9 | 39.4 | 2.21 | 328 | −21.1 |
| PHU 4-4 | 80 | 24 | 18.3 | 47.3 | 2.59 | 330 | −21.6 |
| PHU 5 | 80 | 24 | 7.70 | 14.5 | 1.89 | 275 | −10.5 |

<Example 1-4> Preparation of Pressure-Sensitive Adhesive (PSA) Including PHU

The PHU synthesized in Example 1-3 was mixed with methyl ethyl ketone (MEK) to prepare a 20 w/v % solution and then coated on a PET sheet (thickness: 50 μm) with a drawdown coater (EC-100, ChemInstruments, Inc) and a wire wound rod, and dried for 10 minutes in a 100° C. oven to prepare PSA.

Experimental Example 1

The coating film thickness of the pressure-sensitive adhesive (PSA) including the PHU prepared in Examples 1~4 was measured.

Referring to Table 2, the thickness of the prepared PSA (PHU 4-1, PHU 4-2, PHU 4-3, PHU 4-4, and PHU 5) was measured as 19.4 to 21.4 μm.

TABLE 2

| PHUs | Adhesive thickness (μm) |
|---|---|
| PHU 4-1 | 19.4 ± 1.6 |
| PHU 4-2 | 21.4 ± 1.3 |
| PHU 4-3 | 20.5 ± 1.2 |
| PHU 4-4 | 20.6 ± 1.2 |
| PHU 5 | 19.7 ± 1.3 |

The PSA prepared in Examples 1~4 was stored for 12 hours under a condition of a temperature of 25° C. and a humidity of 50%, and then the following adhesion tests were performed.

Experimental Example 2

A 180° peel adhesion test was performed according to ASTM D3330 (Standard Test Method for Peel Adhesion of Pressure-Sensitive Tape). A PSA strip was cut to 1 inch wide and attached to PSTC-grade polished stainless steel test panels (ASTM A666) by applying constant pressure using a 4.5 lb ASTM standard hand roller, and a peel strength test was performed at a peeling rate of 305 mm min-1 using a 180° peel adhesion testing machine (PA-1000-180, ChemInstruments, Inc.). The average peel strength and a standard deviation were calculated from result values of three experiments for each sample.

Commercially available PSA tapes (Duct tape, Scotch® tape, Electrical tape, and Post-it® tape note) were also tested for peel strength in the same manner.

Referring to FIGS. 9A and 9B, it was confirmed that the 180° peel adhesion of the PHU-based pressure-sensitive adhesive was 3.39 to 5.50 N cm$^1$, which was the same performance as the Scotch tape and the Duct tape, and in the process of peeling the adhesive from the stainless panel, the adhesive was clearly removed without leaving any adhesive residue.

Experimental Example 3

An initial tack force test was measured using a Polyken™ Probe Tack (PT-1000, ChemInstruments, Inc.) according to ASTM D2979 (Standard Test Method for Pressure-Sensitive Tack of Adhesives Using an Inverted Probe Machine). As a maximum value measured when a probe having a diameter of 5 mm was brought into contact with the adhesive surface of the PSA for 1 second and then removed at a speed of 610 mm min-1, an average value was calculated through the result values of three experiments for each sample.

Referring to FIG. 10, the initial tack force of the PHU-based pressure-sensitive adhesive was 0.214 to 1.46 N, which was confirmed as the same result as the commercially available PSA tapes, such as Post-it® Tape Note and Scotch® Tape.

Experimental Example 4

A shear strength test was measured using a room temperature 10 bank shear tester (SS-RT-10, ChemInstruments, Inc.) according to ASTM D3654 (Standard Test Methods for Shear Adhesion of Pressure-Sensitive Tapes). A PSA strip was attached to a 1×1 inch surface of a PSTC-grade polished stainless steel panel by applying constant pressure using a 4.5 lb ASTM standard hand roller. Then, a 500 g weight was hung at the bottom of the strip to measure the time taken for detaching the PSA strip from the panel.

Referring to FIG. 11, the time of the PSA prepared by PHU 4 (PHU 4-1 to PHU 4-4) was less than 350 min, and the time of the PSA prepared by PHU 5 showed a result of 2572 min.

It was found that the structural properties of the PHU affected the adhesive s through the peel adhesion, initial tack force, and shear strength tests. General elastomer-based PSA exhibits adhesive properties by block copolymers with an elastomer molecular weight reaching hundreds of thousands, but in the case of PHU according to the present disclosure, although Mn=18.3 kg mol$^{-1}$ or less, excellent adhesion properties were shown, which was determined as a characteristic exhibited by additional hydrogen bonding by a hydroxyl group in addition to a urethane group of the PHU.

In PHU 4-4 having the largest molecular weight, the peel adhesion and the initial tack force decreased and the shear strength increased, which was a result of improving the cohesion of polymer chains by increasing the chain entanglement according to an increase in molecular weight. In addition, the improvement of the cohesion of the polymer chains is closely related to an increase in storage modulus (G') of the polymer, and when G' is increased, the elasticity property is superior, so that the shear strength is increased.

Since PHU 5 had the lowest molecular weight as Mn=7.70 kg moll, but cadaverine has a lower molecular weight than Priamine™ 1075 and a linear structure, it is considered that it is advantageous to form hydrogen bonding between PHU chains compared to PHU 4, so that the cohesion is strengthened due to hydrogen bonding, and the shear strength is greatly increased.

So far, although the specific embodiments of the method for preparing the polyhydroxyurethane according to an embodiment of the present disclosure, the polyhydroxyurethane prepared using the method, and the pressure-sensitive adhesive comprising the polyhydroxyurethane had been described, it is apparent that various modifications can be made without departing from the scope of the present disclosure.

Therefore, the scope of the present disclosure should not be limited to the exemplary embodiments and should be defined by the appended claims and equivalents to the appended claims.

In other words, the exemplary embodiments described above are illustrative in all aspects and should be understood as not being restrictive, and the scope of the present disclosure is represented by appended claims to be described below rather than the detailed description, and it is to be interpreted that the meaning and scope of the appended claims and all changed or modified forms derived from the equivalents thereof are included within the scope of the present disclosure.

What is claimed is:

1. A method for preparing polyhydroxyurethane comprising:
    (a) preparing dimer acid diglycidyl ester represented by Chemical Formula 2 below from dimer acid represented by Chemical Formula 1 below;
    (b) preparing dimer acid dicyclic carbonate represented by Chemical Formula 3 below by introducing carbon dioxide ($CO_2$) into the dimer acid diglycidyl ester prepared in step (a); and (c) preparing polyhydroxyurethane represented by Chemical Formula 5 below by reacting diamine with the dimer acid dicyclic carbonate prepared in step (b), wherein step (a) is performed by a first reaction by adding epichlorohydrin and benzyltriethylammonium chloride to the dimer acid represented by Chemical Formula 1, and then a second reaction by adding calcium oxide (Ca) and sodium hydroxide (NaOH):

[Chemical Formula 1]

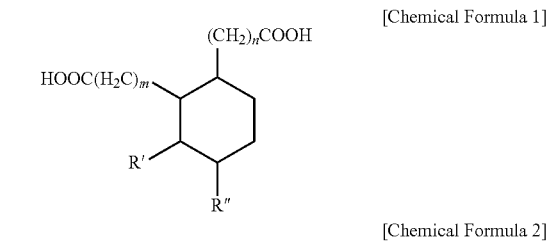

[Chemical Formula 2]

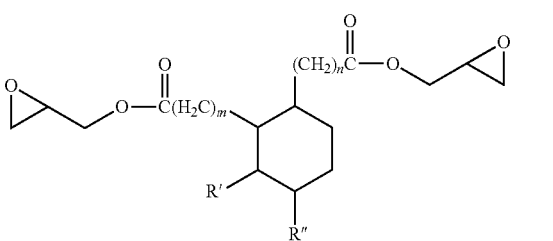

[Chemical Formula 3]

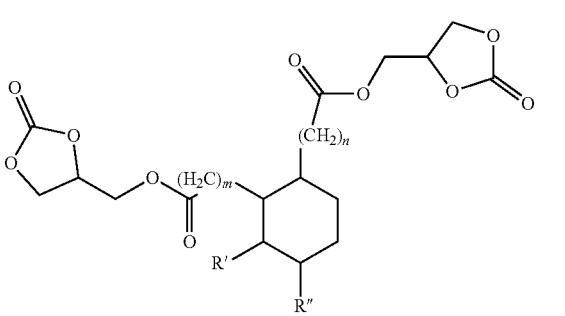

[Chemical Formula 5]

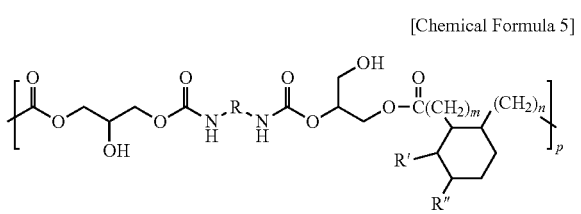

Wherein, R, R' and R" are the same or different and are substitutable hydrocarbon groups, and represent an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group, and n, m and p are the same or different, and are integers of 1 to 10.

2. The method for preparing polyhydroxyurethane of claim 1, wherein the dimer acid represented by Chemical Formula 1 is derived from vegetable oils.

3. The method for preparing polyhydroxyurethane of claim 1, wherein the first reaction is performed at 100 to 130° C. for 20 to 40 minutes.

4. The method for preparing polyhydroxyurethane of claim 1, wherein the second reaction is performed at 60 to 80° C. for 70 to 110 minutes.

5. The method for preparing polyhydroxyurethane of claim 1, wherein step (b) is performed at 70 to 100° C. for 15 to 25 hours.

6. The method for preparing polyhydroxyurethane of claim 1, wherein the diamine of step (c) is represented by Chemical Formula 4:

[Chemical Formula 4]

$$H_2N \diagup R \diagdown NH_2$$

Wherein, R is a substitutable hydrocarbon group, and represents an alkyl group having 1 to 12 carbon atoms, an aryl group or a heteroaryl group having 3 to 10 ring atoms, wherein the alkyl group, the aryl group, and the heteroaryl group may be substituted with substituents selected from hydroxy, amino, alkyl, alkyloxy, alkylamino, dialkylamino, aryl, aryloxy, arylamino, diarylamino, or heteroaryl group.

7. The method for preparing polyhydroxyurethane of claim 1, wherein the diamine in step (c) is selected from the group consisting of C1-C12 alkylenediamine, benzenediamine, phenyldiamine, cyclohexanediamine and dimerdiamine.

8. The method for preparing polyhydroxyurethane of claim 1, wherein step (c) is performed at 60 to 100° C. for 2 to 24 hours.

9. A Polyhydroxyurethane prepared by the method of claim 1 and represented by Chemical Formula 5a, 5b or 5c below:

[Chemical Formula 5a]

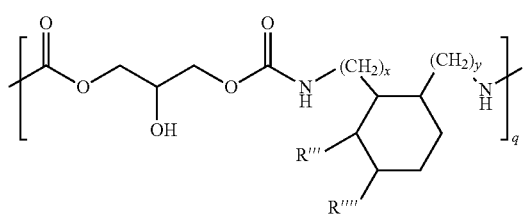

[Chemical Formula 5b]

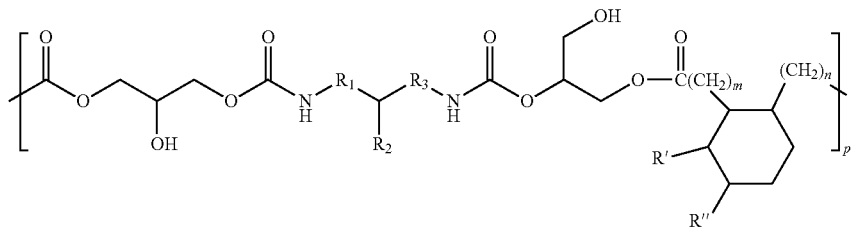

[Chemical Formula 5c]

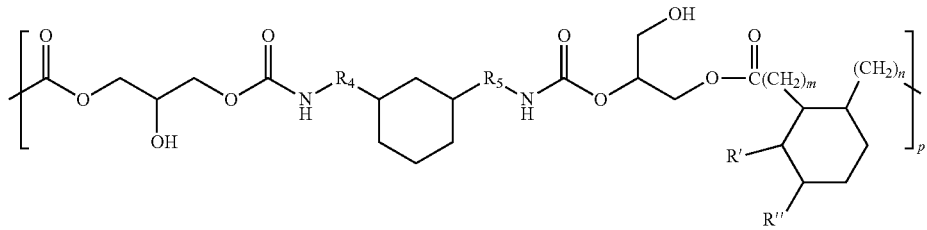

Wherein,
R', R'', R''' and R'''' are each independently an alkyl group having 1 to 12 carbon atoms,
R1, R2, R3, R4, and R5 are each independently an alkyl group having 1 to 3 carbon atoms,
n, m, x, and y are each independently integers from 1 to 10, and
q is an integer from 1 to 20, and p is an integer from 1 to 10.

10. The polyhydroxyurethane of claim 9, wherein a residue of carbon dioxide contained in the polyhydroxyurethane is 1 to 20 wt % based on the total weight.

11. A pressure-sensitive adhesive comprising the polyhydroxyurethane of claim 9.

12. The pressure-sensitive adhesive of claim 11, wherein the 180° peel adhesion (ASTM D3330) is 3 to 6 N cm$^{-1}$.

13. The pressure-sensitive adhesive of claim 11, wherein the initial tack force (ASTM D2979) is 0.1 to 2 N.

14. The pressure-sensitive adhesive of claim 11, wherein the shear strength (ASTM D3654) is $1 \times 10^2$ to $30 \times 10^2$ min.

* * * * *